United States Patent
Moodie

[11] 3,743,381
[45] July 3, 1973

[54] ARRANGEMENT FOR EFFECTING ROTATIONAL MOTION BETWEEN POLARIZING ELEMENTS

[75] Inventor: Donald E. Moodie, Nashua, N.H.
[73] Assignee: Polaroid Corporation, Cambridge, Mass.
[22] Filed: Aug. 23, 1971
[21] Appl. No.: 173,838

[52] U.S. Cl. ............................ 350/159, 74/89.22
[51] Int. Cl. ............................................. G02b 7/00
[58] Field of Search ..................... 350/159, 157; 74/89.22, 89.2, 89.21, 96, 99, 89; 325/455

[56] References Cited
UNITED STATES PATENTS
3,371,979  3/1968  Catanzaro .................... 350/159
3,592,069  7/1971  Welch .......................... 74/89.2
3,159,844  12/1964 Haboush ....................... 350/159
2,786,361  3/1957  Russell ......................... 74/89.22
2,651,771  9/1953  Palmer ......................... 350/159

FOREIGN PATENTS OR APPLICATIONS
878,847  10/1961  Great Britain .................. 350/159

Primary Examiner—Ronald L. Wibert
Assistant Examiner—Ronald J. Stern
Attorney—Charles Mikulka, Robert F. Peck et al.

[57] ABSTRACT

A control device comprising a roller-band and guiding assembly which minimizes friction, in conjunction with tackle means and fixed and rotatable light polarizers in a compact housing to effect a variable transmission of light through an aperture and, more particularly, through the windows of vehicles such as aircraft. The foregoing assembly and tackle means cooperate to convert substantially frictionless linear actuator movement into a greater amount of rotational movement of a light polarizer.

24 Claims, 7 Drawing Figures

PATENTED JUL 3 1973 3,743,381

INVENTOR.
DONALD E. MOODIE

BY

Brown and Mikulka
ATTORNEYS

INVENTOR.
DONALD E. MOODIE

BY

Brown and Mikulka
ATTORNEYS

ARRANGEMENT FOR EFFECTING ROTATIONAL MOTION BETWEEN POLARIZING ELEMENTS

BACKGROUND OF THE INVENTION

1. Field of the Invention

The present invention relates to a device in which are combined the well-known rolling geometry and nearly frictionless bearing capabilities of an assembly comprising roller elements, a resilient band and guideway means known as "rolamite," with a multiplication of motion provided by pulley means integral with one of the roller elements and conveyed to a rotatable light polarizer to effect a given rotation of the latter. The rotatable light polarizer, in cooperation with an optically-aligned fixed light polarizer, provides a variable transmission of light through an adjacent aperture depending upon the principal axial direction of the rotatable light polarizer at any given degree of its rotation.

2. Description of the Prior Art

The employment of two optically-aligned light polarizing elements, e.g., linear polarizers mounted for relative variation of their polarizing directions to effect variations of light transmission or other optical effects, is well known and extensively covered in the art. Among United States patents relating thereto are the following:

| Patent No. | Inventor | Date of Issue |
|---|---|---|
| 2,237,566 | Edwin H. Land | April 8, 1941 |
| 2,255,933 | Edwin H. Land | September 16, 1941 |
| 2,260,220 | Martin Graban | October 21, 1941 |
| 2,281,112 | William H. Ryan | April 28, 1942 |
| 2,302,507 | William H. Ryan | November 17, 1942 |
| 2,311,840 | Edwin H. Land | February 23, 1943 |

The rolamite principle and structures relating thereto are discussed at length in a publication of the Clearinghouse for Federal Scientific and Technical Information, National Bureau of Standards, U.S. Department of Commerce, Springfield, Virginia 22151, titled "Rolamite: A New Mechanical Design Concept." The subject is also treated in detail in an instruction manual published by Precision Metals Division, Hamilton Watch Company, Lancaster, Pennsylvania 17604, U.S.A.; and in U.S. Pat. No. 3,572,141, issued Mar. 23, 1971 to D. F. Wilkes.

BRIEF SUMMARY OF THE INVENTION

The subject invention is directed to a simple, compact and efficient device for varying the amount of light transmitted through an aperture, such as through the windows of passenger-carrying aircraft. Inasmuch as control of light transmission is to be exercised most conveniently by the occupant of a seat adjacent to the window, it is essential that operation of the device be as simple, trouble free, easy to operate and efficient as possible. These objectives are enhanced by incorporation of a rolamite assembly in the mechanism. Furthermore, the relatively close linear spacing of the windows in aircraft places emphasis on the requirement for compactness of the device. In the subject invention, this involves a relatively minimum lateral movement of an actuating or control means to obtain a maximum rotational movement or response of a light modifying polarizing element. The latter objective is largely made possible by the incorporation of tackle elements, namely, a pulley integral with a roller component and cable means extending from the roller component to a peripheral attachment means of the rotatable light polarizing disc. The device includes a compact housing enclosing the roller-band-guideway assembly, tackle and light polarizing elements.

With reference to the foregoing considerations, a principal object of the present invention is to provide an improved control device for varying the transmission of light through a window, such as through the windows of passenger-transporting aircraft.

Other objects are to provide a device of the character described embodying the low frictional characteristics and adaptability to combine with tackle means of a roller-band-guideway assembly combination enabling a multiplication of rotational movement of a light polarizing element relative to a given linear movement of the foregoing assembly and tackle means; to provide a device as stated wherein are employed a set of two rollers, a pulley axially aligned and connected to one of the rollers, a rotatably mounted light polarizing disc, and a pair of cables passing around the pulley and attached at one end to the disc and at the other end to substantially fixed holding means, the device enabling a given rotation of the disc; to provide a device of the type indicated in which are employed two laterally-spaced or tandem sets of rollers, a pair of pulleys one of which is axially aligned and integral with one roller of each set, and a pair of cables, one passing around the pulley of one set and the other passing around the pulley of the other set, the device enabling an augmented rotation of the disc; to provide a device of the nature set forth comprising manual actuating means for moving the rollers and pulleys laterally while permitting their unimpeded rotation; to provide devices of the character described of a compactness and so housed as to be adapted in installation inwardly of each window of commercial aircraft; and to provide a device as recited which is capable of providing a control of incident light ranging from extinction to a given maximum transmission thereof.

Other objects of the invention will in part be obvious and will in part appear hereinafter.

BRIEF DESCRIPTION OF THE DRAWINGS

The novel features which are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

DETAILED DESCRIPTION

Figure 1:
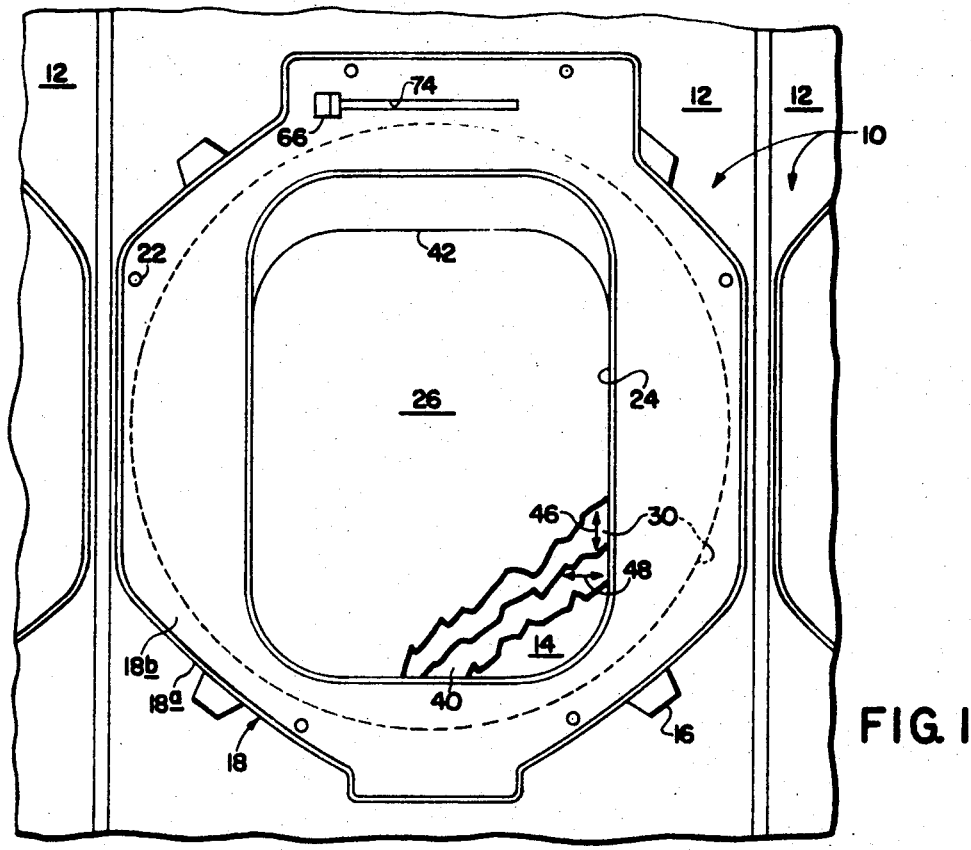
FIG. 1 is a diagrammatic front view, with parts broken away, of the device of the invention mounted in an aircraft.

A control device 10 of the invention is shown in FIG. 1 in association with portions of similar devices at either side thereof. The devices are mounted on the inboard wall 12 of an aircraft, in alignment with each window 14 of the aircraft, as by bracket means 16.

Each control device 10 comprises a housing 18 which includes an outboard (toward the window) section 18a, in which mechanism of the invention is mounted, and an inboard or cover section 18b, releasably attached to threaded recesses 20 of section 18a by the screws 22. The housing is of an injection-molded form, preferably composed of a suitable plastic material such, for example, as polycarbonate.

An inboard mounting frame 24 formed in the cover section 18b, having a transparent panel 26, preferably composed of a plastic sheet material, mounted therein, is aligned with an aperture 28 formed in the outboard section 18a. A linearly light polarizing disc 30 is peripherally mounted for rotation in the upper guide rollers 32 and the lower guide roller 34. The guide rollers are rotatably mounted in section 18a and grooved to provide a low-frictional rotational suspension of the disc. The lower roller 34 is mounted on a pivotal arm 36, biased toward the disc 30 by a flat spring 38 bearing against a flat surface of the housing section. This type of mounting accommodates to possible thermal expansion or contraction of the disc 30.

Figure 2:
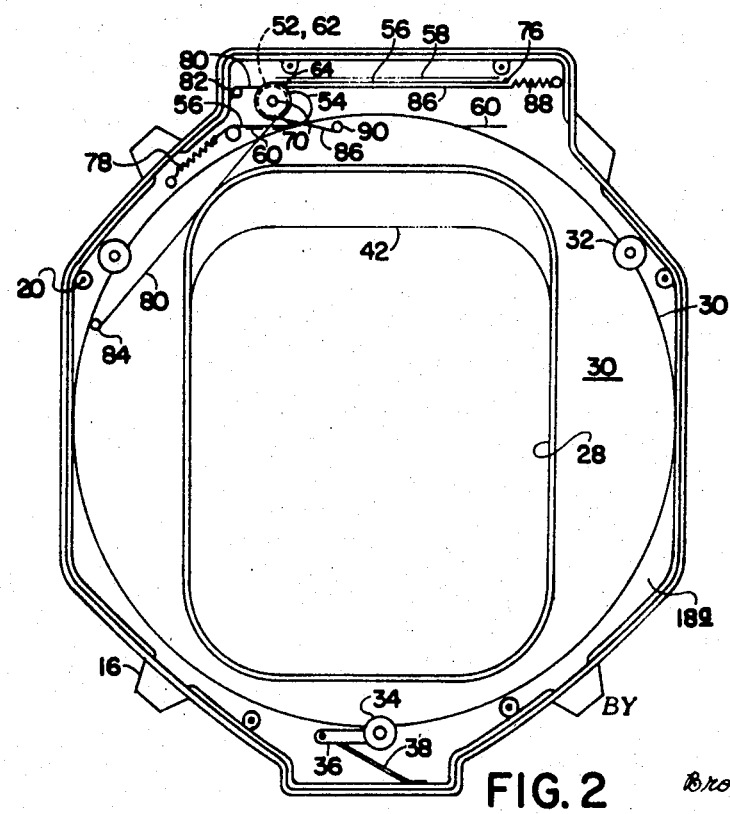
FIG. 2 is a similar view of the device with its front panel removed to show the internal mechanism.
Figure 3:
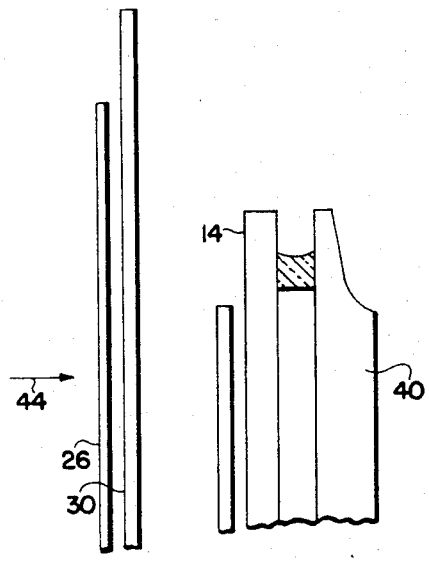
FIG. 3 is a diagrammatic fragmentary side view of light transmitting elements of the invention in relation to an aircraft window.

A second linear light polarizer 40 is fixedly mounted in a smaller frame means 42 outboard of and in optical alignment with the polarizing disc 30. The aircraft window 14 is located outboard of the fixed polarizing panel 40. The mounting interrelation of polarizing and other elements is shown more clearly in FIG. 3, the arrow 44 indicating the order of arrangement in a direction from inboard to outboard. As shown in FIG. 1, the mounting frame 42 is to be considered as seen through panel 26 and polarizing disc 30. In FIG. 2, the aperture 28 and mounting frame 42 are seen through the disc 30.

The double-headed arrows 46 and 48 (FIG. 1) represent invisible polarizing directions or axes within the disc 30 and panel 40, respectively. As illustrated, these directions are crossed at 90° and, assuming an adequate efficiency of the linear polarizers, substantially no light would be transmitted from the aircraft window into the cabin. When the disc 30 is rotated clockwise from the position of FIG. 2, various amounts of light are admitted depending upon the angular relation of internal polarizing axes represented by the arrows 46 and 48, the maximum admittance thereof occurring when a parallel relation of the arrows exists. This would be provided by a 90° clockwise rotation of disc 30 if such were possible. The rotational capability of the disc will be described further, below.

Reference will now be had to the interrelated roller-band-guideway assembly and tackle mechanism for controlling the rotation of light polarizing disc 30.

The assembly 50 of the control device is, basically, of a generally conventional form and comprises a pair of rollers 52 and 54, a band element 56 and upper and lower parallel tracks 58 and 60, respectively, the tracks serving to form the guideway. By way of example, with special reference to their adaptation to the present invention, the rollers 52 and 54 are composed of either a steel or a molded plastic such as nylon and may, suitably, be of ⅝ inch diameter. The parallel tracks 58 and 60 may be flat and composed of a metal or of an essentially non-deformable plastic such as that of the housing 18. The spacing of tracks 58 and 60 is less than twice the diameters of the rollers. The band 56 may be formed of a metal or of a suitable plastic. It is preferably composed of a spring steel, e.g., of a blued spring steel 0.003 inch in thickness. It may be noted that the diameter of the rollers is chosen with reference to the level of bending stress permissible in the band 56.

The resilient band 56 is attached at each end to means, discussed below, providing its being under tension and substantially in contact with the track surfaces 58 and 60. Intermediate portions of the tensioned band 56 are wrapped in an "S" configuration around the rollers 52 and 54 so as to couple the rollers together and bias them oppositely toward the parallel tracks 58 and 60. The rollers 52 and 54 are, essentially, free-floating and, by reason of their given diameters and the bias applied thereto by the band 56, the line connecting their centers is inclined with respect to the tracks at a given angle, e.g., an angle which, preferably, is less than 45°. Any force applied laterally to a roller causes the pair to roll linearly and in opposite rotation in contact with the band which, in turn, is biased by the rollers against the track surfaces 58 and 60.

A pulley 62 having a diameter which, preferably, is similar to that of roller 52, with guide flanges 64 forming a pair of grooves around its surface, is axially aligned and preferably integral with roller 52, although it may be mounted rotationally attached with respect thereto. An actuating knob 66 is rotationally fastened, as by the integral shaft 68 to an extension 62a of the pulley. A stub shaft 70 of the pulley extension 63 is mounted for rotation in a bushing 72 of the shaft 68. The shaft 68 protrudes through a slot 74 formed in the cover section 18b. The pulley 62 and shaft 68 may be formed of any suitable material as, for example, that of which the rollers are composed.

The flexible band 56 is attached at one end to a fixed stud 76 of housing section 18a and, after passing around the rollers 52 and 54, is attached at the other end to a coil-type extension spring 78 also attached to section 18a which provides tensioning of the band. A cable 80 formed, for example, of nylon or a braided steel is attached at one end to a fixed stud 82, passes partially around the groove 62a of the pulley 62 identified with roller 52, and is attached at its other end to a stud 84 adjacent to the periphery of the light polarizing disc 30. A second cable 86, of a similar material to that of cable 80, is attached at one end to spring means, such as the extension spring 88, passes partially around the groove 62b of the pulley 62, and is attached at its other end to a stud 90 of the light polarizing disc 30 predeterminedly spaced from stud 84.

Figure 5:
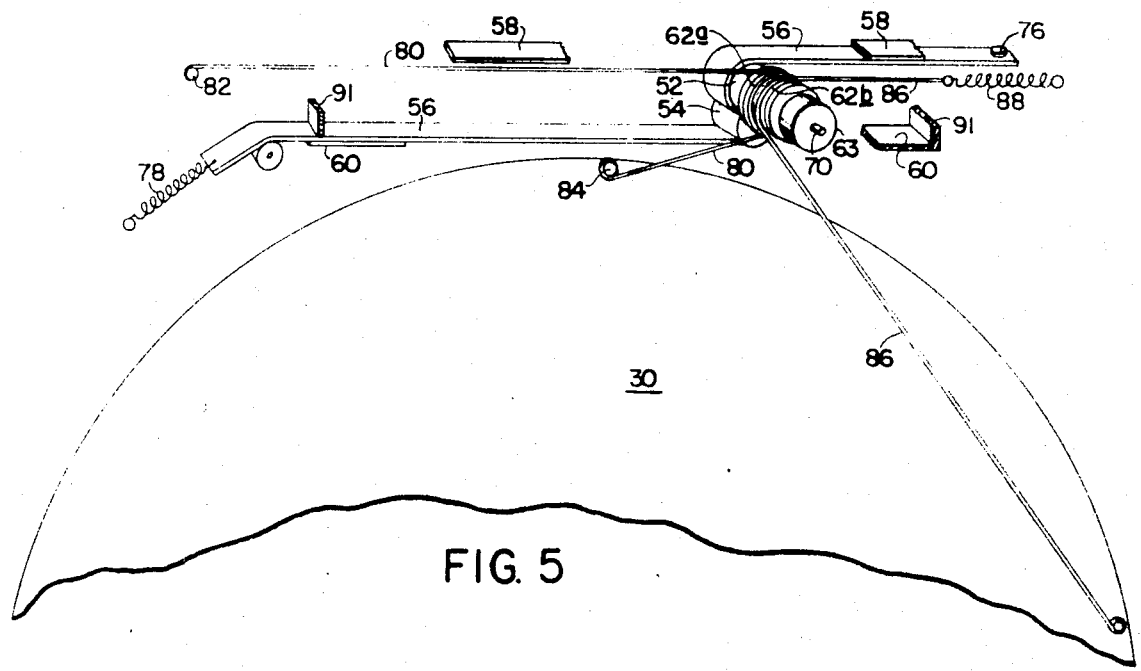
FIG. 5 is a diagrammatic perspective front view illustrating the roller-band-guideway assembly and tackle mechanism in enlarged detail.

When the knob 66 and rollers are moved to the right, from the positions of knob and rollers shown in FIGS. 1 and 2, the cable 80 has been tautened and the cable 86 is substantially free from tautening, thus producing rotation of the light polarizing disc 30 to the position shown in FIG. 5. This operation produces an approach to parallelism of the polarizing direction 46 (FIG. 1) of the disc 30 with the polarizing direction 48 of the panel 40. A multiplication of the linear movement of the knob 66 and associated rollers 52 and 54 and pulley 62 occurs, in terms of the rotational movement of the disc 30, and more particularly arcuate movement of the attaching means 84 and 90, which, in the example shown is somewhat less than two-to-one. Thus, assuming the pulley 62 to have a diameter of approximately ⅝ inch, the disc 30 a diameter of 16 inches, and the linear movement of knob 66 to be 5 ½ inches, a 72° rotation of disc 30 is possible. While this degree of rotation does not permit true parallelism of the polarizing directions 30 and 48 nor a maximum transmission of light by the structure illustrated, visibility through the aircraft window is sufficient for practical purposes.

The multiplication of motion, above described, is provided by the tackle function performed by the pulley 62 and cables 80 and 86 which produce an augmented arcuate movement of any point on the periphery of the disc 30 relative to linear movement of the pulley. Due to space limitations of an aircraft, the possible lateral movement of the pulley is somewhat curtailed in the example given and, accordingly, rotation of the disc is less than could be produced with an increased lateral movement of the pulley. The right- and left-hand limits of movement of the roller and pulley combination are defined by limit stop means of any suitable type, such as limit stops 91.

The extension spring 88, to which one end of cable 86 is attached, serves as a "compliance" component. Its compliance function serves to accommodate to differences in the rates of change of the lengths of the cables 80 and 86 between the pulley 62 and the spaced points of attachment 84 and 90 of the disc 30. Accordingly, both cables are under tension at all times and no slack occurs. A reverse movement of the knob 66 from the extreme right-hand position it would occupy in conjunction with FIG. 5 would produce a counterclockwise rotation of disc 30.

Wherein a condition of light extinction to one of maximum light transmission has been described above, it will be understood that the position of the knob and associated components of FIGS. 1 and 2 could represent a condition of maximum transmission, assuming polarizing directions 30 and 48 to then be at parallel relation. A movement of the knob to the right would then provide a diminishing transmission of light. Of course, an appreciable basic loss of light occurs in each polarizer, per se, and polarizers having suitable transmission characteristics for the purpose are assumed to have been selected.

Figure 4:
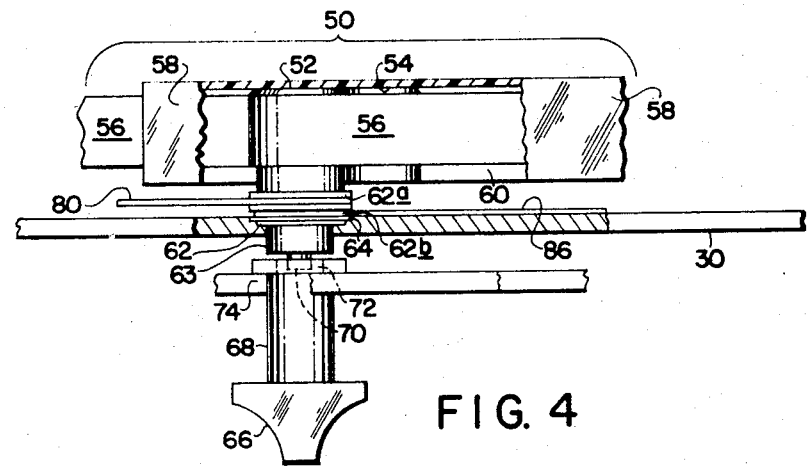
FIG. 4 is a diagrammatic fragmentary top view, partly in section, of the device.
Figure 6:
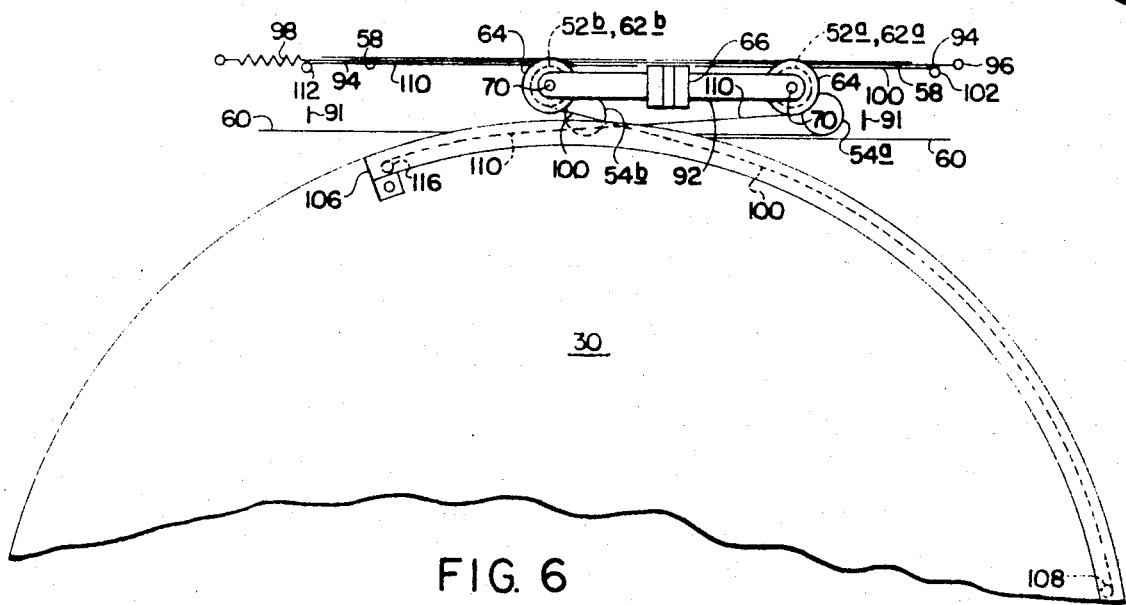
FIG. 6 is a diagrammatic front view of a modification of the roller-band-guideway assembly and tackle mechanism.

A modification of the device of FIGS. 2, 4 and 5, above described, to achieve a full 90° rotation of the disc 30 within the limited linear movement of the knob 66 is permitted is shown in FIG. 6. It includes two roller and pulley combinations, of the general type previously shown in tandem, except that each pulley includes but a single groove, the object being to obtain augmented lengths of pull at the periphery of disc 30 for a linear movement of the control knob 66 which movement need be only slightly greater than that previously described.

The stub shaft 70 of each roller 52a and 52b is rotationally mounted in a bar element 92. The knob 66 is fixedly attached to the bar element. The band 94 serves a function with respect to both roller pairs which is substantially identical to that described above. In this instance, however, a single band passes around two sets of rollers. It is fixedly attached at stud 96, passes around rollers 52a and 54a, thence to roller 54b, and around rollers 54b and 52b to extension spring 98.

Figure 7:
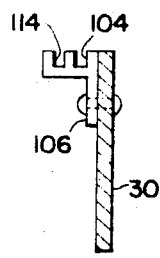
FIG. 7 is a diagrammatic fragmentary sectional view of the cable guide means of FIG. 6.

A cable 100 is attached at one end to the fixed stud 102, passes partially around the pulley 62b (concentric with roller 52b), along the channel 104 of the arcuate guide means 106 attached to disc 30 (FIG. 7), and is fastened to the stud 108 affixed to the latter. A cable 110 is attached at one end to the fixed stud 112, passes partially around the pulley 62a (concentric with roller 52a), along the channel 114 of the arcuate guide means 106, and is fastened to the stud 116. Thus, in contrast to the embodiment of FIG. 2 wherein a section or sections of the cables 80 and 86 extend across a section of the polarizing disc 30 in the manner of a chord of the circle defined thereby, a section or sections of the cables 100 and 110 extend along a circular path around the rotational axis of the polarizing disc 30. However, it will be noted that in both illustrated embodiments, an intermediate section of one cable is supported on pulley means and the portions of that cable immediately adjacent its such intermediate section generally extend from the pulley means in a first given direction while an intermediate section of the other cable is supported on pulley means and the portions of that cable immediately adjacent its such intermediate section generally extend from the pulley means in a direction substantially opposite to the aforementioned given direction. Further, the two aforementioned opposite directions are, generally speaking, the directions of displacement of the roller-band assemblies.

A movement of the knob 66 to the right produces a clockwise rotation of disc 30 and vice-versa. It will be noted that the pull-angle of the cables relative to the horizontal at the extremes of right- and left-hand movement of the knob 66 is less than is the case in FIGS. 2 and 5 and, accordingly, linear movement of the pulleys 62a and 62b provides a greater degree of rotation of disc 30 than is readily possible in the initially-described structure. The increased distance of rotation of the disc 30 at its periphery is approximately equal to the lateral spacing between the pulleys 62a and 62b. Assuming a 16 ½ inch diameter of disc 30 and a 6 ½ inch movement of the knob 66, a two-to-one multiplication of motion is possible. Thus the disc 30 can be rotated a full 90°. This permits an augmented range of performance, e.g., from complete extinction to a greater maximum transmission of incident light than was possible in the showing of FIGS. 2 and 5. At all positions of the knob 66, the angle formed by the cables as they wrap around the pulley remains essentially constant. It will be noted that no extension spring is required to provide cable compliance in the structure of FIG. 6, as the cables will always be in a tautened condition.

It will be understood that the subject invention may be practiced or embodied in other ways without departing from the spirit or character thereof. The preferred embodiments described herein are to be regarded, therefore, as illustrative and not restrictive, the scope thereof being indicated by the appended claims and all variations which come within the meaning of the claims are intended to be embraced therein.

What is claimed is:
1. Apparatus comprising:
a first light polarizing element;
a second light polarizing element;

means for mounting said polarizing elements in juxtaposed relationship for relative rotational motion therebetween about an axis passing through said polarizing elements; and means for effecting reversible relative rotational motion between said light polarizing elements whereby the light transmitting characteristic of said light polarizing elements in combination may be varied, said means including a unitary actuator member, means for mounting said actuator member for displacement in opposite directions and connector means for coupling said actuator member to two points spaced apart from each other and from said axis on one of said light polarizing elements and for causing said points to be displaced a greater distance responsive to the displacement of said actuator member than the distance which said actuator member is displaced, said connector means including pulley means connected to said actuator member for displacement in unison therewith and a pair of flexible cables, each said cable having a first end connected to a respective said point on said one light polarizing element, a second end connected to a member of said apparatus independent of said one light polarizing element and an intermediate section supported on said pulley means, the two portions of one said cable, immediately adjacent said intermediate section thereof, extending from said pulley means generally in one direction of displacement of said actuator member and the two portions of the other said cable, immediately adjacent said intermediate section thereof, extending from said pulley means generally in the other direction of displacement of said actuator member.

2. The apparatus of claim 1 wherein said pulley means comprises a unitary member.

3. The apparatus of claim 1 wherein said pulley means comprises a pair of pulley members.

4. The apparatus of claim 1 wherein said actuator member is mounted for displacement along a path parallel to a tangent of the circle of rotation associated with said rotational motion.

5. The invention of claim 1 wherein said apparatus is structured such that the axes of rotation of said pulley members are disposed in spaced apart parallel relationship and both said pulley members rotate in the same direction responsive to displacement of said actuator member.

6. The apparatus of claim 1 wherein said means for displaceably mounting said actuator member comprises a roller-band assembly.

7. The apparatus of claim 2 wherein said roller-band assembly includes at least one pair of rollers with a flexible band wrapped around portions of said rollers in an "S" configuration and means providing a pair of spaced parallel bearing surfaces constituting a guideway between and toward which said band and rollers are positioned and biased.

8. A control device for providing a variable transmission of light passing through an aperture, said device comprising:

an assembly including at least one pair of rollers with a flexible band wrapped around portions of said rollers in an "S" configuration and means providing a pair of spaced parallel bearing surfaces constituting a guideway between and toward which said band and rollers are positioned and biased;

a pulley concentric with and attached to one of said rollers, said pulley having a pair of side-by-side guide grooves formed in and around its surface;

a fixed light polarizing panel element having a given direction of polarization;

a light polarizing disc element of a given diameter and having a given direction of polarization;

means for mounting said light polarizing disc element for rotational motion in juxtaposed relationship to said fixed light polarizing panel element;

a pair of cables each of which is fastened at one end to retaining means, passes around an individual groove of said pulley and is fastened at an opposite end to one of a pair of peripheral attaching means of said disc element, the two portions of one said cable, immediately adjacent the section thereof passing around said pulley, extending from said pulley on one side of said pulley and the two portions of the other said cable, immediately adjacent the section thereof passing around said pulley, extending from said pulley on the opposite side of said pulley, said attaching means being predeterminedly spaced apart adjacent to the periphery of the disc element; and actuating means for moving said rollers and pulley linearly through a given distance to provide a multiplication of movement of said disc element attaching means in opposite arcuate directions.

9. A control device, as defined in claim 8, wherein said assembly includes only one said pair of rollers.

10. A control device, as defined in claim 8, wherein said device comprises a compact housing aligned with each said aperture and substantially enclosing said roller-band-guideway assembly, pulley, light polarizing elements, cables and actuating means.

11. A control device, as defined in claim 8, wherein said actuating means comprises a manually movable knob to which said pulley is rotationally connected.

12. A control device, as defined in claim 11, additionally including a pair of spaced apart limit stops operative to define the limits of the manual movement of said knob.

13. A control device, as defined in claim 10, wherein said housing includes means defining a slot therein and said actuating means comprises a manually movable knob located exteriorly of said housing, and said actuating means additionally includes shaft means interconnected between said knob and said pulley so as to extend through said slot.

14. A control device, as defined in claim 12, wherein said light polarizing elements are linear polarizers and are basically arranged with respect to their internal polarizing directions so that said directions are substantially at 90° to one another providing a substantial extinction of incident light when the movement of said knob is restrained by one of said limit stops and are at an angular relation providing a maximum transmission of said light when the movement of said knob is restrained by the other of said limit stops.

15. A control device, as defined in claim 8, wherein said mounting means comprises a plurality of low friction-type guide rollers disposed along predeterminedly spaced points of the periphery of said rotatable light polarizing disc, each said guide roller including a peripheral groove in which a section of said rotatable light polarizing discs is seated.

16. A control device, as defined in claim 15, wherein a one of said guide rollers is mounted on a spring-biased arm, thereby to accommodate any thermal expansion or contraction of said disc.

17. A control device, as defined in claim 10, additionally included a protective light-transmitting panel in said housing in juxtaposed relationship with said light polarizing elements and on the opposite side of one of said light polarizing elements from the other of said light polarizing elements.

18. A control device, as defined in claim 8, wherein said retaining means of at least one of said cables is in the form of a spring, thereby providing a compliance function with respect to differences in the rates of change in length of said cables between said pulley and said peripheral cable attaching means of said disc element.

19. A control device, as defined in claim 18, wherein said spring is an extension spring.

20. A control device for providing a variable transmission of light passing through an aperture such as through the windows of aircraft, said device comprising:
an assembly composed of two sets of rollers in tandem connected by a lateral bar of given length in which an extension of one of the two rollers of each set is mounted adjacent to opposite ends of said bar, said rollers having a flexible band wrapped around portions thereof in an "S" configuration and said assembly including a pair of spaced parallel bearing surfaces constituting a guideway between and toward which the rollers of each set are positioned and biased;
a pair of pulleys one of which is concentric with and attached to one of said rollers of each set, each said pulley having a single groove formed in and around its surface;
a fixed light polarizing panel element having a given direction of polarization;
a light polarizing disc element of a given diameter and having a given direction of polarization;
means for mounting said light polarizing disc element for rotational motion in juxtaposed relationship to said fixed light polarizing panel element;
a pair of cables each of which is fastened at one end to retaining means, passes around a groove of an individual one of said pulleys and is fastened at an opposite end to one of a pair of peripheral attaching means of said disc element, the two portions of one said cable, immediately adjacent the section thereof passing around its associated said pulley, extending from its associated said pulley generally in one direction lengthwise of said guideway and the two portions of the other said cable, immediately adjacent the section thereof passing around its associated said pulley, extending from its associated said pulley generally in the other direction lengthwise of said guideway, said attaching means being predeterminedly spaced apart adjacent to the periphery of the disc element; and
actuating means for moving said bar linearly through a given distance to provide a multiplication of movement of said disc element attaching means in opposite arcuate directions.

21. A control device, as defined in claim 20, wherein an actuating knob is affixed to said bar to enable manual movement thereof linearly in opposite directions.

22. A control device, as defined in claim 20, wherein are included limit stop means for determining the limits of travel of said rolamite roller assembly and pulleys in lateral directions.

23. A control device, as defined in claim 20, wherein said cables are conducted along portions of said disc element adjacent to the periphery thereof by arcuate guide means affixed to said disc portions.

24. A control device, as defined in claim 23, wherein said guide means comprises a pair of side-by-side grooves, each groove being adapted to conduct an individual cable to said attaching means.

* * * * *